United States Patent [19]

Barth et al.

[11] Patent Number: 4,653,060
[45] Date of Patent: Mar. 24, 1987

[54] GAS LASER TUBE AND METHOD FOR MANUFACTURING THE SAME

[75] Inventors: Heinz Barth, Munich; Erwin Hübner, Grafing; Hinrich Heynisch, Gräfelfing; Adolf Schneider, Munich, all of Fed. Rep. of Germany

[73] Assignee: Siemens Aktiengesellschaft, Berlin and Munich, Fed. Rep. of Germany

[21] Appl. No.: 750,682

[22] Filed: Jun. 28, 1985

[30] Foreign Application Priority Data

Jun. 29, 1984 [DE] Fed. Rep. of Germany ....... 3424118

[51] Int. Cl.⁴ .............................................. H01S 3/03
[52] U.S. Cl. .................................................... 372/61
[58] Field of Search ...................... 372/61, 103, 92, 65

[56] References Cited

U.S. PATENT DOCUMENTS 3,555,450  1/1971  Rockwell, Jr. ..................... 372/103
3,717,823  2/1973  Abdale et al. ..................... 372/103
4,421,386  12/1983 Podgorski ........................... 350/609

FOREIGN PATENT DOCUMENTS 3307233 10/1983 Fed. Rep. of Germany .

Primary Examiner—Gene Wan

Attorney, Agent, or Firm—Herbert L. Lerner; Laurence A. Greenberg

[57] ABSTRACT

A gas laser tube assembly includes:
  a gas laser tube having two ends; and
  two optical elements each vacuum-tightly closing off a respective one of the ends of the gas laser tube, at least one of the optical elements at one end of the gas laser tube including a flange and a terminating body formed of a given material;
the flange:
  being rigid, being formed of a metal thermally matched to the given material of the terminating body, being inserted into and connected to the gas laser tube, having the shape of a washer with two sides and a central beam passage opening formed therein, and having a meandering profile with a plurality of right angle turns immediately following each other and pointing alternatingly toward one of the sides of the flange; and
the terminating body:
  being formed of a material transparent to laser radiation, having the shape of a plate, being inserted into the beam passage opening, being connected to the flange by glass solder, and being extended beyond the tangential plane of both of the sides of the flange in a direction normal to the plate and a method for manufacturing the same.

6 Claims, 1 Drawing Figure

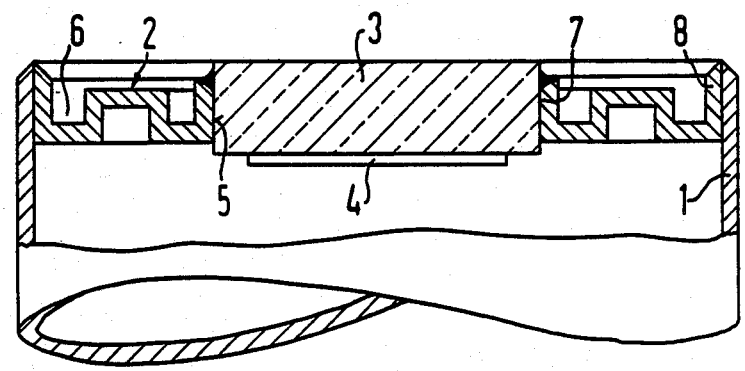

GAS LASER TUBE AND METHOD FOR MANUFACTURING THE SAME

The invention relates to a gas laser tube being vacuum-tightly closed off at both ends thereof by optical elements, at least one of the optical elements including a flange and a terminating body, the flange being formed of metal, being connected to the gas laser tube, having the shape of a washer with a central beam passage opening formed therein and a profile having a plurality of turns immediately following each other and pointing alternately toward one of the sides of the flange, and the terminating body being formed of a material transparent to laser radiation, having the shape of a plate, being inserted into the beam passage opening, being connected to the flange by glass solder, and being extended beyond the tangential plane of both sides of the flange in direction normal to the terminating plate.

Such a tube is described, for instance, in U.S. Pat. No. 3,555,450.

In the prior art laser structure, the optical termination, namely a Brewster window or an output mirror, is disposed in a metallic frame. The metal part is connected to the terminating element by solder (hard or glass solder) and is hard-soldered or welded to the tube. In this manner, a hermetic seal is produced, while accepting the disadvantages of high process temperatures which reduce the optical qualities of the terminating element to a greater or lesser degree.

The device described in the above-mentioned patent therefore also extends the window or mirror body beyond its setting or mounting on both sides and uses a thin diaphragm with a corrugated profile and a large outside diameter as the frame. Such a structure provides the ability to polish and optionally coat the optical element only after it is soldered-in, and in the subsequent thermal processes, a considerable part of the thermal stresses are intercepted. However, the overall device is not especially stable; in particular, the laser output can be reduced by mechanical effects which set the terminating element in vibration and/or tilt it.

The mounting becomes less sensitive to shock if the optical element is soldered into a metallic, thermally-matched washer. This unit is placed on a metal aperture fused to the laser tube, and both metal parts are welded together at the rim, as in U.S. Pat. No. 3,717,823. During the welding, this double flange must permit a temperature drop of 1200° C. between the weld and the light-transparent body, as is explained in the patent; both metal plates must therefore be very thin and/or have a large outside diameter. The entire suspension is therefore still not particularly secure against the loss of adjustment and/or it requires considerable transverse dimensions and is furthermore rather expensive, if only due to the fact that three vacuum-tight connections must be made instead of two.

It is accordingly an object of the invention to provide a laser tube and method of manufacturing the same, which overcomes the hereinafore-mentioned disadvantages of the heretofore-known devices and methods of this general type, and to place the optical terminations in a plasma tube in such a manner that the device is compact and rugged, can keep the terminating elements in their position under normal operating conditions; and in addition does not require a special manufacturing effort.

With the foregoing and other objects in view there is provided, in accordance with the invention, a gas laser tube assembly, comprising a gas laser tube having two ends; and two optical elements each vacuum-tightly closing off a respective one of the ends of the gas laser tube, at least one of the optical elements at one end of the gas laser tube including a flange and a terminating body formed of a given material;

the flange:
being rigid, being formed of a metal thermally matched to the given material of the terminating body, being inserted into and connected to the gas laser tube, having the shape of a washer with two sides and a central beam passage opening formed therein, and having a meandering profile with a plurality of right angle turns immediately following each other and pointing alternatingly toward one of the sides of the flange; and the terminating body:
being formed of a material transparent to laser radiation, having the shape of a plate, being inserted into the beam passage opening, being connected to the flange by glass solder, and being extended beyond the tangential plane of both of the sides of the flange in a direction normal to the plate.

If, according to the invention, the flange and the plate are to be "thermally matched", this means that a permanently gas-tight glass solder connection can be made between the two parts. This is normally possible if the flange has an average thermal coefficient of expansion which is between 0.9 and 1.2-times the corresponding plate coefficient, in the temperature range of interest. A particularly secure connection comes about if the flange expands with temperature somewhat more than the plate.

The metal setting or mounting constructed in accordance with the invention is a rigid part with a correspondingly large wall thickness of preferably at least 1 mm. Nevertheless, its thermal resistance along the path between the outer rim and the beam passage opening is relatively large, because the washer-shaped flange has a meander-shaped profile with right angle turns available. This profile shape increases the path length to a far greater degree than, for instance, a wave profile such as is provided in U.S. Pat. No. 3,555,450 for reasons of elasticity. To this extent, the metal frame can also be given relatively small transverse dimensions and does not require an additional matching part which would have to reduce the washer diameter to the tube diameter.

The washer itself is relatively simple to fabricate: the meander profile could be generated, for instance, by cutting or milling-in circular grooves.

The provision of a Brewster window device with concentric grooves is known from German Published, Non-Prosecuted Application DE-OS No. 33 07 233, corresponding to U.S. Pat. No. 4,421,386. However, the grooves provided in that device are located in the window body itself and serve merely as an elastic buffer which is supposed to keep stresses that occur during operation and are caused by thermal mismatches, away from the central window region.

In accordance with another feature of the invention, the flange has a wall thickness of at least 1 mm.

In accordance with an additional feature of the invention, the flange of the optical element at the one end of the gas laser tube includes ribs pointing away from the other of the ends of the gas laser tube with free rib ends, one of the ribs being connected to the terminating plate and the other to the gas laser tube, in vicinity of the free rib ends.

In accordance with a further feature of the invention, the terminating plate is formed of ZnSe and the flange is formed of $Ni_{48}Fe_{52}$.

In accordance with a further mode of the invention, there is provided a method of manufacturing a gas laser tube assembly, including a gas laser tube having two ends and two optical elements for vacuum-tightly closing off the ends of the gas laser tube, at least one of the optical elements including a flange and a terminating plate formed of a material transparent to laser radiation, the flange being rigid, being formed of a metal thermally matched to the material of the terminating plate, and having the shape of a washer with two sides and a central beam passage opening formed therein, which comprises initially cutting grooves into the flange forming a meandering profile with a plurality of right angle turns following each other and pointing alternately toward one of the sides of the flange, subsequently glass soldering the terminating plate into the beam passage opening with the terminating plate extended beyond the tangential plane of both of the sides of the flange in a direction normal to the terminating plate, smoothing at least one surface of the terminating plate, surrounding the gas laser tube with a metallic sleeve at a given location along the tube, and finally welding the flange to the inside of the gas laser tube at the given location while the metallic sleeve is in place.

In accordance with a concomitant mode of the invention, there is provided a method which comprises coating at least one surface of the terminating plate.

Other features which are considered as characteristic for the invention are set forth in the appended claims.

Although the invention is illustrated and described herein as embodied in a gas laser tube and method for manufacturing the same, it is nevertheless not intended to be limited to the details shows, since various modifications and structural changes may be made therein without departing from the spirit of the invention and within the scope and range of equivalents of the claims.

The construction and method of operation of the invention, however, together with additional objects and advantages thereof will be best understood from the following description of specific embodiment when read in connection with the accompanying single FIGURE of the drawing, which is a fragmentary, diagrammatic, cross-sectional view which is partly broken away, of a preferred embodiment of the gas laser tube of the invention.

Referring now to the FIGURE of the drawing in detail, there is seen an output end of a "sealed-off" $CO_2$ laser which is intended for an output power of some 10 watts and could be used, for instance, in medicine.

The tube end contains a metal cylinder 1, a washer-shaped flange or aperture disc 2 and a mirror body or terminating plate 3.

The plate or mirror body 3 is coated on the inside thereof with a dielectric multiple layer 4 which is partially transparent for a wavelength of 10.6 μm. The terminating plate or body 3 itself is formed of zinc selenide which, for all practical purposes, does not absorb in this wavelength range. An $Ni_{48}Fe_{52}$ alloy which is thermally matched to ZnSe, is chosen for the washer-shaped flange 2. The washer-shaped flange has a beam passage opening 5 formed therein, into which the mirror body is inserted so that base surfaces project on both sides. The flange 2 also has circular grooves 6 formed alternatingly in both sides thereof. The dimensions of the grooves are selected in such a way that the mounting or setting has a minimum wall thickness of at least 1 mm everywhere. In vicinity of the opening 5 and the outer rim thereof, the washer-shaped flange at one end of the tube ends in ribs 7, 8 which point away from the other end of the tube. The ribs 7, 8 are in contact with the terminating plate or mirror body 3 and the metal cylinder 1, respectively, and are beveled at their outer ends and secured vacuum-tightly by glass solder 9 or a welded joint.

The termination of the tube is constructed as follows: Initially, the ZnSe plate or body is soldered to the metal washer-shaped flange using a stable or crystallizing glass solder which is provided either as a powder or in pre-pressed and pre-sintered form. The two base surfaces of the plate or body are then polished and the inside surface is provided with the required dielectric layers. Subsequently, the washer-shaped flange is inserted into the metal cylinder and the welded joint is made. In cases where the distance between the two ribs of the flange is very small and/or cases in which the mirror body or plate must be protected particularly well, the end of the laser tube should be surrounded by a copper ring during the welding operation, which immediately conducts part of the heat which is supplied to the outside.

The foregoing is a description corresponding in substance to German Application No. P 34 24 118.3, dated June 29, 1984, the International priority of which is being claimed for the instant application, and which is hereby made part of this application. Any material discrepancies between the foregoing specification and the aforementioned corresponding German application are to be resolved in favor of the latter.

We claim:

1. Gas laser tube assembly, comprising:
   a gas laser tube having two ends; and
   two optical elements each vacuum-tightly closing off a respective one of said ends of said gas laser tube, at least one of said optical elements at one end of said gas laser tube including a flange and a terminating body formed of a given material;
   said flange:
      being rigid, being formed of a metal thermally matched to said given material of said terminating body, being inserted into and connected to said gas laser tube, having the shape of a washer with two sides and a central beam passage opening formed therein, and having a meandering profile with a plurality of right angle turns immediately following each other and pointing alternatingly toward one of said sides of said flange; and
   said terminating body:
      being formed of a material transparent to laser radiation, having the shape of a plate, being inserted into said beam passage opening, being connected to said flange by glass solder, and being extended beyond the tangential plane of both of said sides of said flange in a direction normal to said plate.

2. Tube assembly according to claim 1, wherein said flange has a wall thickness of at least 1 mm.

3. Tube assembly according to claim 1, wherein said flange of said optical element at said one end of said gas laser tube includes ribs pointing away from the other of said ends of said gas laser tube with free rib ends, one of said ribs being connected to said terminating plate and the other to said gas laser tube, in vicinity of said free rib ends.

4. Tube assembly according to claim 1, wherein said terminating plate is formed of ZnSe and said flange is formed of $Ni_{48}Fe_{52}$.

5. Method of manufacturing a gas laser tube assembly, including a gas laser tube having two ends and two optical elements for vacuum-tightly closing off the ends of the gas laser tube, at least one of the optical elements including a flange and a terminating plate formed of a material transparent to laser radiation, the flange being rigid, being formed of a metal thermally matched to the material of the terminating plate, and having the shape of a washer with two sides and a central beam passage opening formed therein, which comprises initially cutting grooves into the flange forming a meandering profile with a plurality of right angle turns following each other and pointing alternately toward one of the sides of the flange, subsequently glass soldering the terminating plate into the beam passage opening with the terminating plate extended beyond the tangential plane of both of the sides of the flange in a direction normal to the terminating plate, smoothing at least one surface of the terminating plate, surrounding the gas laser tube with a metallic sleeve at a given location along the tube, and welding the flange to the inside of the gas laser tube at the given location while the metallic sleeve is in place.

6. Method according to claim 5, which comprises coating at least one surface of the terminating plate.

* * * * *